United States Patent
Hack et al.

(10) Patent No.: US 11,669,502 B2
(45) Date of Patent: *Jun. 6, 2023

(54) COORDINATED VERSION CONTROL SYSTEM, METHOD, AND RECORDING MEDIUM FOR PARAMETER SENSITIVE APPLICATIONS

(71) Applicant: International Business Machines Corporation, Armonk, NY (US)

(72) Inventors: Michel H. T. Hack, Cortlandt Manor, NY (US); Yufei Ren, Somers, NY (US); Yandong Wang, Elmsford, NY (US); Li Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 434 days.

This patent is subject to a terminal disclaimer.

(21) Appl. No.: 16/775,612

(22) Filed: Jan. 29, 2020

(65) Prior Publication Data

US 2020/0167692 A1    May 28, 2020

Related U.S. Application Data

(63) Continuation of application No. 15/169,471, filed on May 31, 2016, now Pat. No. 10,643,147, which is a
(Continued)

(51) Int. Cl.
*G06F 16/18* (2019.01)
*G06N 20/00* (2019.01)
*G06F 16/21* (2019.01)

(52) U.S. Cl.
CPC ........ *G06F 16/1873* (2019.01); *G06F 16/219* (2019.01); *G06N 20/00* (2019.01)

(58) Field of Classification Search
USPC ......................................... 707/610, 613, 615
See application file for complete search history.

(56) References Cited

U.S. PATENT DOCUMENTS 7,593,353 B2    9/2009    Liu et al.
7,921,433 B2    4/2011    McCain et al.
(Continued)

OTHER PUBLICATIONS

United States Notice of Allowance dated Dec. 30, 2019, in co-pending U.S. Appl. No. 15/169,471.
(Continued)

*Primary Examiner* — Cam Linh T Nguyen
(74) *Attorney, Agent, or Firm* — Peter Edwards, Esq.; McGinn I.P. Law Group, PLLC.

(57) ABSTRACT

Version vector-based rules are used to facilitate asynchronous execution of machine learning algorithms. The method uses version vector based rule to generate aggregated parameters and determine when to return the parameters. The method also includes coordinating the versions of aggregated parameter sets among all the parameter servers. This allows to broadcast to enforce the version consistency; generate parameter sets in an on-demand manner to facilitate version control. Furthermore the method includes enhancing the version consistency at the learner's side and resolving the inconsistent version when mismatching versions are detected.

13 Claims, 12 Drawing Sheets

Related U.S. Application Data continuation of application No. 15/169,411, filed on May 31, 2016, now Pat. No. 10,657,459.

(56) References Cited

U.S. PATENT DOCUMENTS

| | | | |
|---|---|---|---|
| 8,040,824 B2 | 10/2011 | Liu et al. | |
| 8,250,397 B2 | 8/2012 | Marcy et al. | |
| 8,538,740 B2 | 9/2013 | Kumar et al. | |
| 8,560,694 B2 | 10/2013 | Keller et al. | |
| 8,635,209 B2 | 1/2014 | Freedman | |
| 8,843,894 B2 | 9/2014 | Dawson et al. | |
| 8,869,119 B2 | 10/2014 | Dawson et al. | |
| 9,116,899 B2 | 8/2015 | Cullen et al. | |
| 9,201,690 B2 | 12/2015 | Meng et al. | |
| 9,223,841 B2 | 12/2015 | Vosshall et al. | |
| 9,348,920 B1 | 5/2016 | Kesin | |
| 9,465,649 B2 | 10/2016 | Meng et al. | |
| 9,465,650 B2 | 10/2016 | Meng et al. | |
| 9,513,967 B2 | 12/2016 | Dube et al. | |
| 9,652,491 B2 | 5/2017 | Meng et al. | |
| 9,652,492 B2 | 5/2017 | Meng et al. | |
| 9,715,408 B2 | 7/2017 | Dube et al. | |
| 9,880,761 B2 | 1/2018 | Hack et al. | |
| 10,031,883 B2 | 7/2018 | Hack | |
| 10,037,302 B2 | 7/2018 | Hack | |
| 10,204,175 B2 | 2/2019 | Hu | |
| 10,225,361 B2 | 3/2019 | Hack | |
| 10,250,705 B2 | 4/2019 | Asvaraksh | |
| 10,250,747 B2 | 4/2019 | Cai | |
| 10,255,701 B2 | 4/2019 | Cai | |
| 10,268,899 B2 | 4/2019 | Cai | |
| 10,296,830 B2 | 5/2019 | Cai | |
| 10,318,199 B2 | 6/2019 | Hack | |
| 10,324,890 B2 | 6/2019 | Hack | |
| 10,346,466 B2 | 7/2019 | Cai | |
| 10,394,266 B2 | 8/2019 | Jin | |
| 10,423,575 B2 | 9/2019 | Hack | |
| 10,467,152 B2 | 11/2019 | Li | |
| 10,685,290 B2 * | 6/2020 | Hack | H04L 41/0813 |
| 2006/0294413 A1 | 12/2006 | Filz et al. | |
| 2009/0119302 A1 | 5/2009 | Palmer | |
| 2012/0198435 A1 * | 8/2012 | Dirstine | G06F 8/65 |
| | | | 717/172 |
| 2013/0125242 A1 | 5/2013 | Farrugia et al. | |
| 2013/0219036 A1 * | 8/2013 | Gusev | G06F 9/5061 |
| | | | 709/223 |
| 2014/0244708 A1 | 8/2014 | Taine et al. | |
| 2014/0289382 A1 | 9/2014 | Chan et al. | |
| 2014/0317055 A1 | 10/2014 | Agrawal | |
| 2016/0092526 A1 | 3/2016 | Kothari et al. | |
| 2017/0091652 A1 | 3/2017 | Miao | |
| 2017/0344904 A1 | 11/2017 | Hack | |
| 2017/0344905 A1 | 11/2017 | Hack | |

OTHER PUBLICATIONS

United States Office Action dated Sep. 11, 2019, in co-pending U.S. Appl. No. 15/169,471.

Ho et al., "More Effective Distributed ML via a Stale Synchronous Parallel Parameter Server." Neural Informsation Processing Systems (NIPS) 2013 pp. 1-9.

Giuseppe Decandia et al., "Dynamo: Amazon's Highly Available Key-value Store". ACM 2007 pp. 205-220.

Mel, et al. "The NIST Definition of Cloud Computing". Recommendations of the National Institute of Standards and Technology. Nov. 16, 2015.

United States Notice of Allowance dated Aug. 12, 2019, in co-pending U.S. Appl. No. 15/169,411.

IEEE A detailed analysis of the KDD CUP 99 data set, Mahbod Tavallaee; Ebrahim Bagheri; Wei Lu; Ali A. Ghorbani, 2009 IEEE Symposium on Computational Intelligence for Security and Defense Applications, Jul. 8-10, 2009 pp. 1-6.

Shin et al.; "Version Management Using Demand-Based Tree For Replicas Consistency In Grid Database", ALPIT IEEE Inter. Conf. On, Jul. 23-25, 2008, pp. 324-332.

Kobusinska et al.; "Version Vector Protocols Implementing Session Gurantees", CCGrid IEEE Inter. Symposium On, vol. 2, May 9-12, 2005, pp. 929-936.

ip.com et al.; "System And Method For Realtime Conflict Detection Of Version Controlled Artifacts", IPCOM000244472D, Dec. 15, 2015, pp. 1-4.

United States Office Action dated Jun. 14, 2019, in co-pending U.S. Appl. No. 15/169,411.

United States Office Action dated Jun. 17, 2019, in co-pending U.S. Appl. No. 15/169,471.

* cited by examiner

ASYNCHRONOUS EXECUTION FACILITATION METHOD 200

COORDINATED VERSION CONTROL SYSTEM, METHOD, AND RECORDING MEDIUM FOR PARAMETER SENSITIVE APPLICATIONS

The present Application is a Continuation Application of U.S. patent application Ser. No. 15/169,471, filed on May 31, 2016, which is a Continuation Application of U.S. patent application Ser. No. 15/169,411, filed on May 31, 2016, the entire contents of which is incorporated herein by reference.

BACKGROUND

The present invention relates generally to a coordinated version control system, and more particularly, but not by way of limitation, to a coordinated version control system for using a rule-based approach to facilitate asynchronous execution, introducing a server side coordinate version control to achieve version consistency, and introducing a learner side version enhancement to further enforce the version consistency.

Many existing machine learning algorithms partition the parameters into multiple disjoint parameter sets and ask distributed parameter servers to aggregate different sets. Meanwhile, contemporary parameter servers adopt asynchronous execution to tolerate slow learners.

Conventionally, in asynchronous execution (on a server side), the constraint that aggregation only happens after all parameters are collected is relaxed. Instead, server can carry out aggregation when a proportion of parameters are received, then send back to clients. Also, in asynchronous execution (on a client side), a learner can continue training without waiting for the arrival of the latest aggregated parameters.

However, there is a technical problem in the conventional techniques that, as a result of this combined design of the server side and the client side, the conventional techniques may create undesirable mismatches between the versions of aggregated parameter sets returned by different servers. Such an issue can lead to slow convergence, or even a complete inability to converge in certain cases.

SUMMARY

The inventors have considered the newly identified technical problem and realized that there is a significant need for a rule-based approach to facilitate asynchronous execution, introducing a server side coordinate version control to achieve version consistency, and introducing a learner side version enhancement to further enforce the version consistency.

In an exemplary embodiment, the present invention can provide a coordinated version control system including a parameter server having a plurality of parameter sets and a plurality of learners communicating with the plurality of parameter sets, the system including a leader parameter collecting circuit configured to parameter set data for a leader parameter set from the plurality of learners, a follower parameter collecting circuit configured to collect parameter set data for a follower parameter set from the plurality of learners, a leader aggregated parameter generating circuit configured to generate a new leader version of a leader aggregated parameter set based on the leader parameter set data, an event broadcasting circuit configured to generate a broadcast event indicating that the new version of the aggregated parameter set has been generated, a broadcast detecting circuit configured to detect the broadcast event, a checking circuit configured to check if a version of the follower parameter set matches the leader new version of the aggregated parameter set based on the broadcast detecting circuit detecting the broadcast event, and a follower aggregated parameter generating circuit configured to generate a new follower version of a follower aggregated parameter that matches the new leader version of the leader aggregated parameter set.

Further, in another exemplary embodiment, the present invention can provide a coordinated version control method for a parameter server having a plurality of parameter sets and a plurality of learners communicating with the plurality of parameter sets, the method including first collecting parameter set data for a leader parameter set from the plurality of learners, second collecting parameter set data for a follower parameter set from the plurality of learners, generating a new leader version of a leader aggregated parameter set based on the leader parameter set data, broadcasting a broadcast event indicating that the new version of the aggregated parameter set has been generated, checking if a version of the follower parameter set matches the leader new version of the aggregated parameter set based on the broadcast event being detected, and generating a new follower version of a follower aggregated parameter that matches the new leader version of the leader aggregated parameter set.

Even further, in another exemplary embodiment, the present invention can provide an asynchronous execution facilitation system including a parameter server having a plurality of parameter sets and a plurality of learners communicating with the plurality of parameter sets, the system including a server checking circuit configured to check if a new version of an aggregated parameter set can be generated based on an intermediate version vector for each of the plurality of learners, an epoch update checking circuit configured to check a number of updated epochs based on a number of the plurality of learners that have pushed updated parameter set data to the parameter server according to the intermediate version vector, and an aggregation triggering circuit configured to generate the new version of the aggregated parameter set if the number of updated epochs is equal to the number of the plurality of learners that have pushed the updated parameter set data to the parameter server multiplied by a predetermined threshold portion of the plurality of learners.

Also, in another exemplary embodiment, the present invention can provide a version enforcement system including a parameter server having a plurality of parameter sets and a plurality of learners communicating with the plurality of parameter sets, the system including a parameter collecting circuit configured to collect the plurality of parameter sets from the parameter server, a version examining circuit configured to determine versions of each of the parameter sets, a mismatch detecting circuit configured to detect if a mismatch exists between the versions of each of the parameter sets, a determining circuit configured to determine a correct version for each of the parameter sets to generate if the mismatch detecting circuit detects the mismatch, a requesting circuit configured to request that each of the parameter sets generate the correct version, a success checking circuit configured to verify that the parameter sets each generate the correct version in response to the request by the requesting circuit, and a local parameter updating circuit configured to automatically update the local parameters for computation by a learner with the correct version of the aggregated parameter sets.

Moreover, in another exemplary embodiment, the present invention can provide a version enforcement method including a parameter server having a plurality of parameter sets and a plurality of learners communicating with the plurality of parameter sets, the method including collecting the plurality of parameter sets from the parameter server, determining versions of each of the parameter sets, detecting if a mismatch exists between the versions of each of the parameter sets, determining a correct version for each of the parameter sets to generate if the detecting detects the mismatch, requesting that each of the parameter sets generate the correct version, checking that the parameter sets each generate the correct version in response to the request by the requesting circuit, and automatically updating the local parameters for computation by a learner with the correct version of the aggregated parameter sets.

Additionally, in another exemplary embodiment, the present invention can provide an asynchronous execution facilitation system including a parameter server having a plurality of parameter sets and a plurality of learners communicating with the plurality of parameter sets including a server checking circuit configured to check each pull request to the parameter server for an immediate version vector and a local epoch of the learner and an aggregation returning circuit configured to compare the immediate version vector pulled by the parameter server with a comparison condition such that if the comparison condition is satisfied, the aggregation returning circuit causes the parameter server to return a new aggregated parameter to the learner, the comparison condition being a comparison of the immediate version vector to a current version of the aggregated parameter set of the parameter server.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
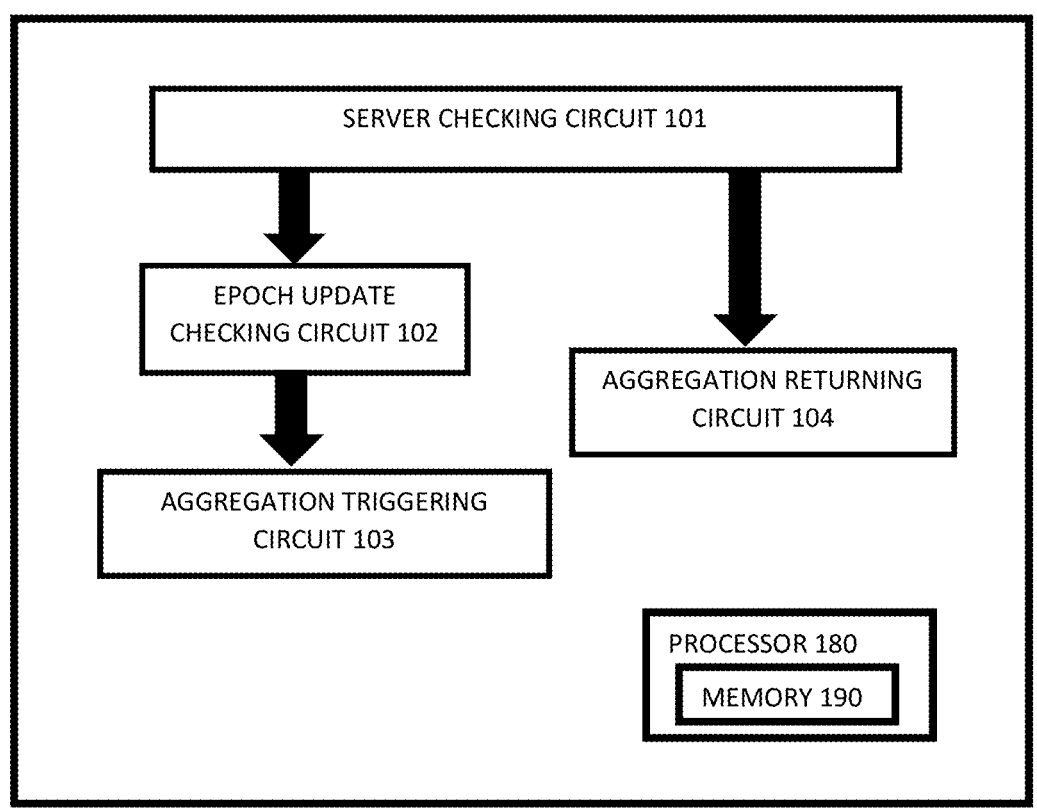
FIG. 1 exemplarily shows a block diagram illustrating a configuration of an asynchronous execution facilitation system 100.

The invention will now be described with reference to FIGS. 1-12, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the asynchronous execution facilitation system 100 includes a server checking circuit 101, an epoch update checking circuit 102, an aggregation triggering circuit 103, and an aggregation returning circuit 104. The asynchronous execution facilitation system 100 includes a processor 180 and a memory 190, with the memory 190 storing instructions to cause the processor 180 to execute each circuit of an asynchronous execution facilitation system 100. The processor and memory may be physical hardware components, or a combination of hardware and software components.

Figure 5:
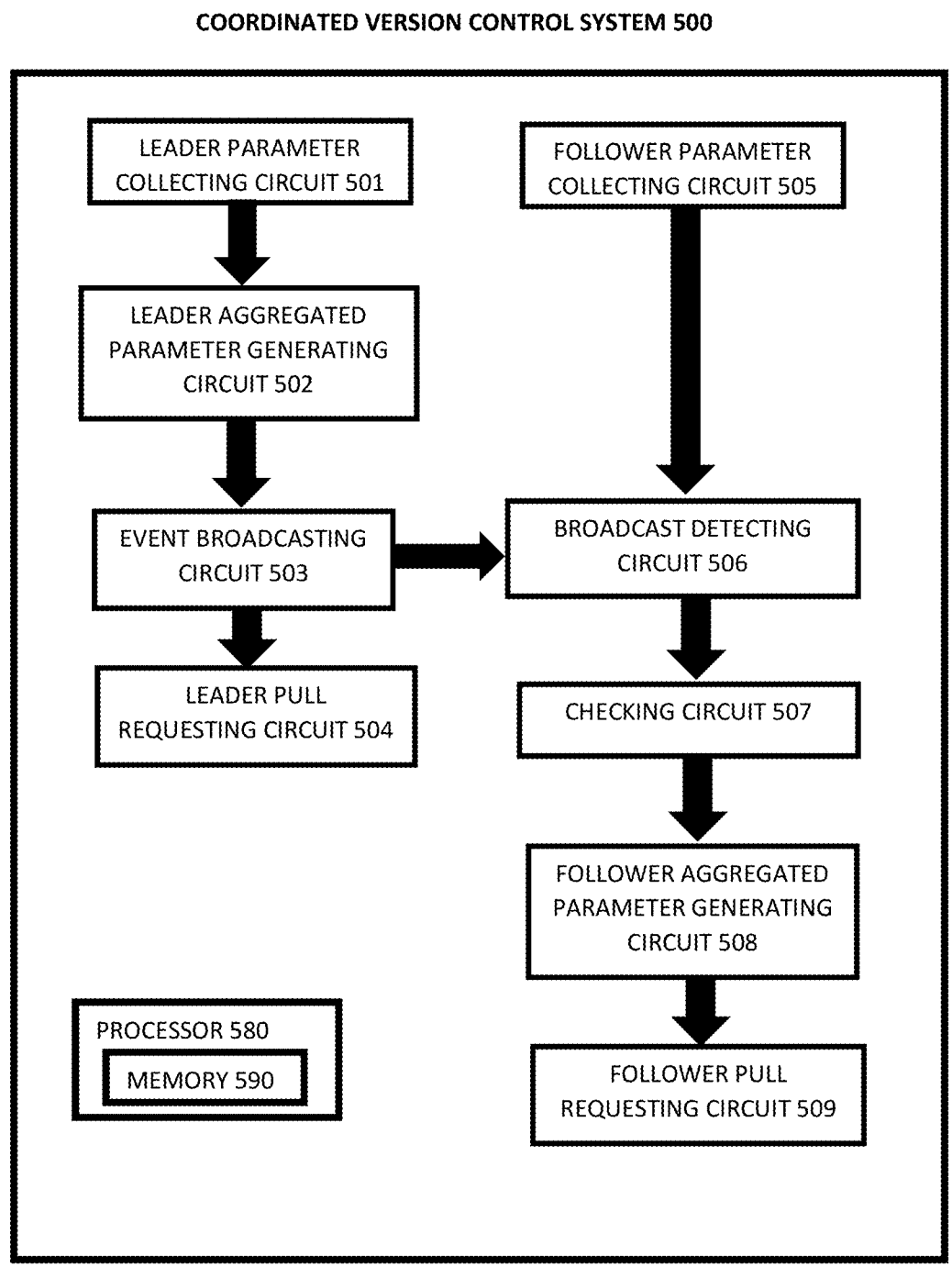
FIG. 5 exemplarily shows a block diagram illustrating a configuration of a coordinated version control system 500.

With reference now to FIG. 5, the coordinated version control system 500 includes a leader parameter collecting circuit 501, a leader aggregated parameter generating circuit 502, an event broadcasting circuit 503, a leader pull requesting circuit 504, a follower parameter collecting circuit 505, a broadcast detecting circuit 506, a checking circuit 507, a follower aggregated parameter generating circuit 508, and a follower pull requesting circuit 509. The coordinated version control system 500 includes a processor 580 and a memory 590, with the memory 590 storing instructions to cause the processor 580 to execute each circuit of coordinated version control system 500. The processor and memory may be physical hardware components, or a combination of hardware and software components.

Figure 7:
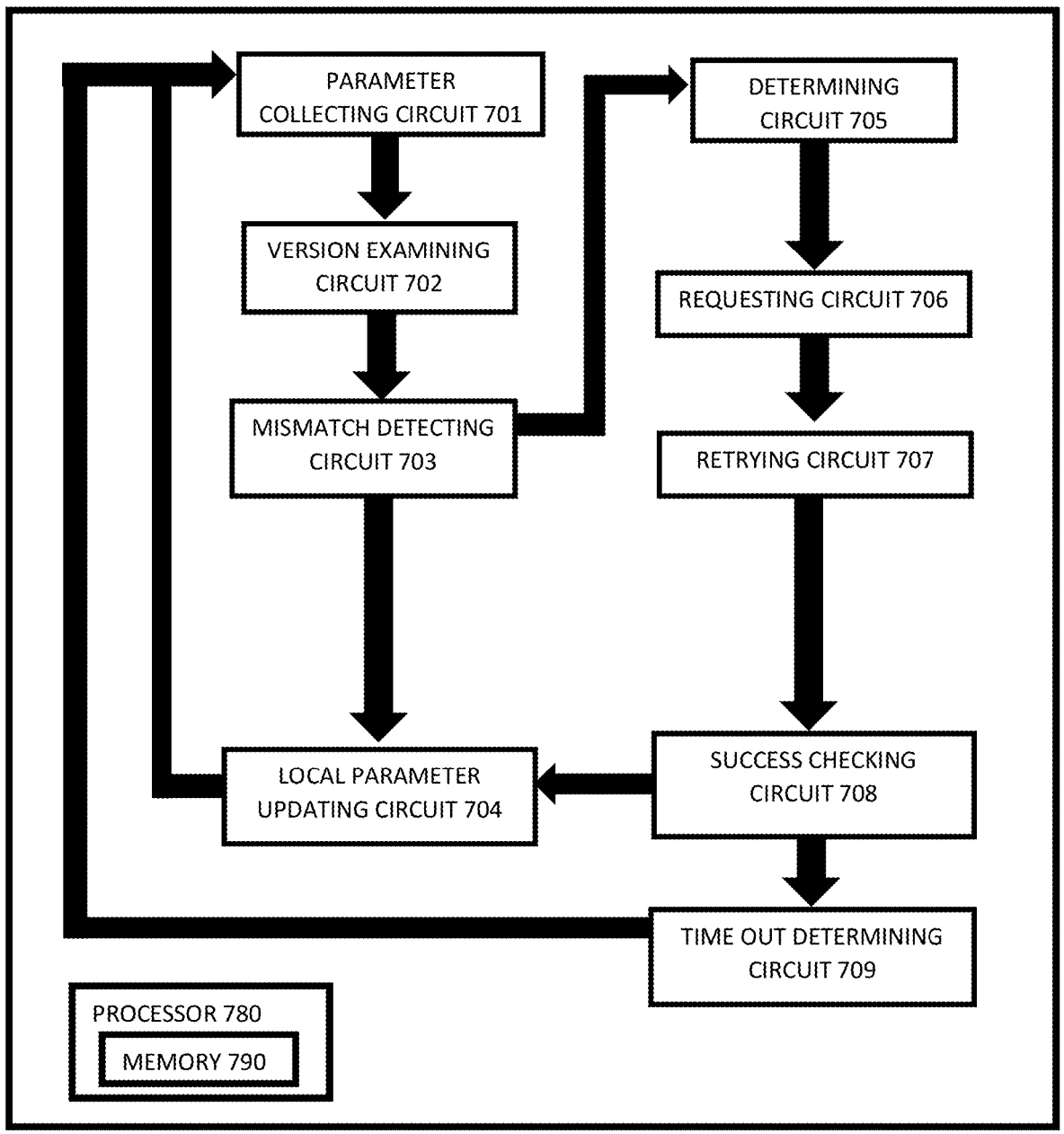
FIG. 7 exemplarily shows a block diagram illustrating a configuration of a version enforcement system 700.

With reference now to FIG. 7, the version enforcement control system 700 includes a parameter collecting circuit 701, a version examining circuit 702, a mismatch detecting circuit 703, a local parameter updating circuit 704, a determining circuit 705, a requesting circuit 706, a retrying circuit 707, a success checking circuit 708, and a time-out determining circuit 709. The version enforcement control system 700 includes a processor 780 and a memory 790, with the memory 790 storing instructions to cause the processor 780 to execute each circuit of the version enforcement control system 700. The processor and memory may be physical hardware components, or a combination of hardware and software components.

Although the asynchronous execution facilitation system 100, the coordinated version control system 500, and the version enforcement system 700 include various circuits, it should be noted that the asynchronous execution facilitation system 100, the coordinated version control system 500, and the version enforcement system 700 can include modules in which the memory 190 (590, 790) stores instructions to cause the processor 180 (580, 780) to execute each module of asynchronous execution facilitation system 100, the coordinated version control system 500, and the version enforcement system 700.

Also, each circuit can be a stand-alone device, unit, module, etc. that can be interconnected to cooperatively produce a transformation to a result.

With the use of these various circuits, the asynchronous execution facilitation system 100, the coordinated version control system 500, and the version enforcement system 700 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by further feature analysis of subgraphs, including dimensionality reduction of the subgraphs, for example by graphical analysis, which extracts topological features and categorizes the resultant subgraph and its associated feature nodes and edges within a subgraph feature space.

Figure 10:
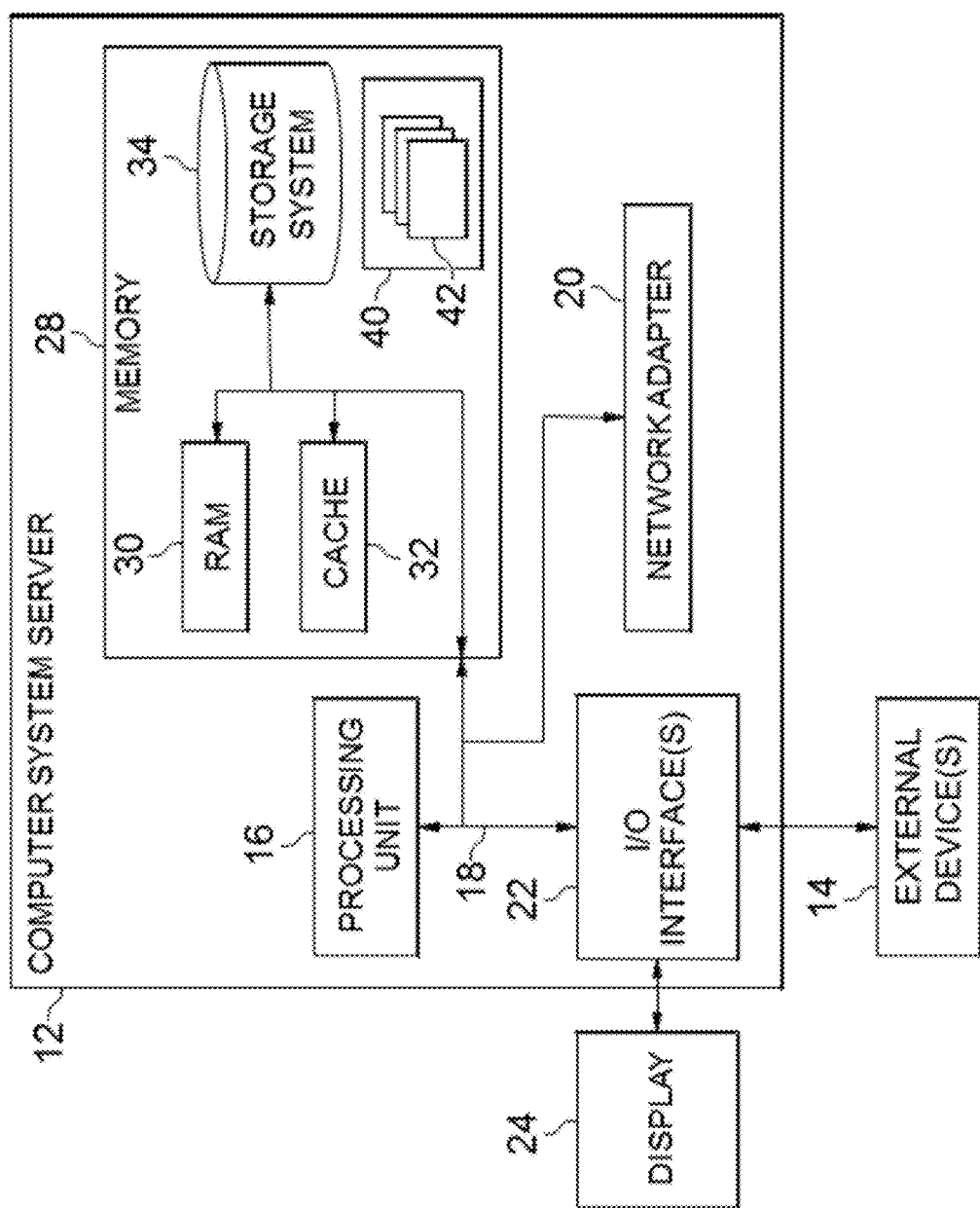
FIG. 10 depicts a cloud computing node 10 according to an embodiment of the present invention.
Figure 11:
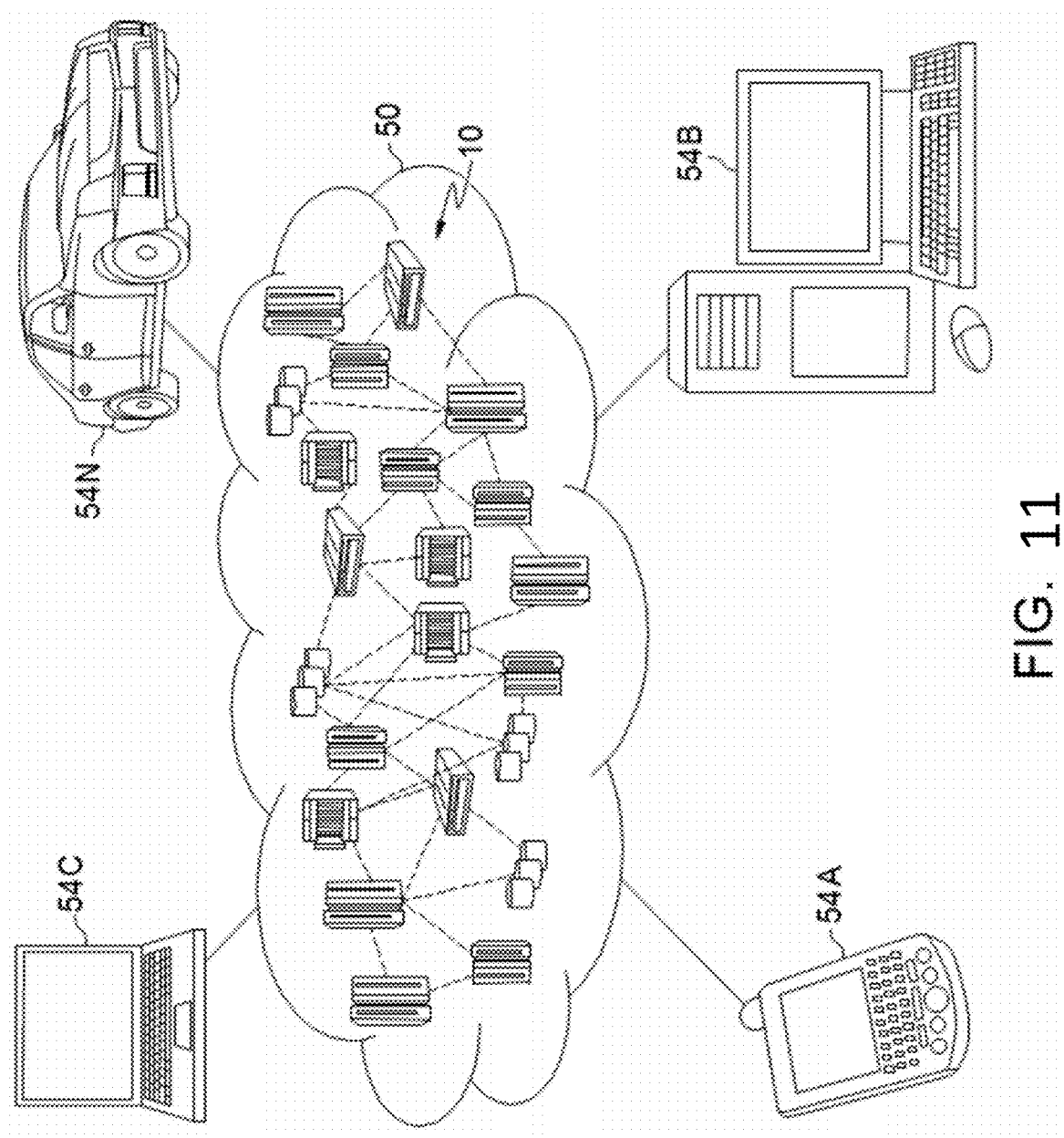
FIG. 11 depicts a cloud computing environment 50 according to another embodiment of the present invention.
Figure 12:
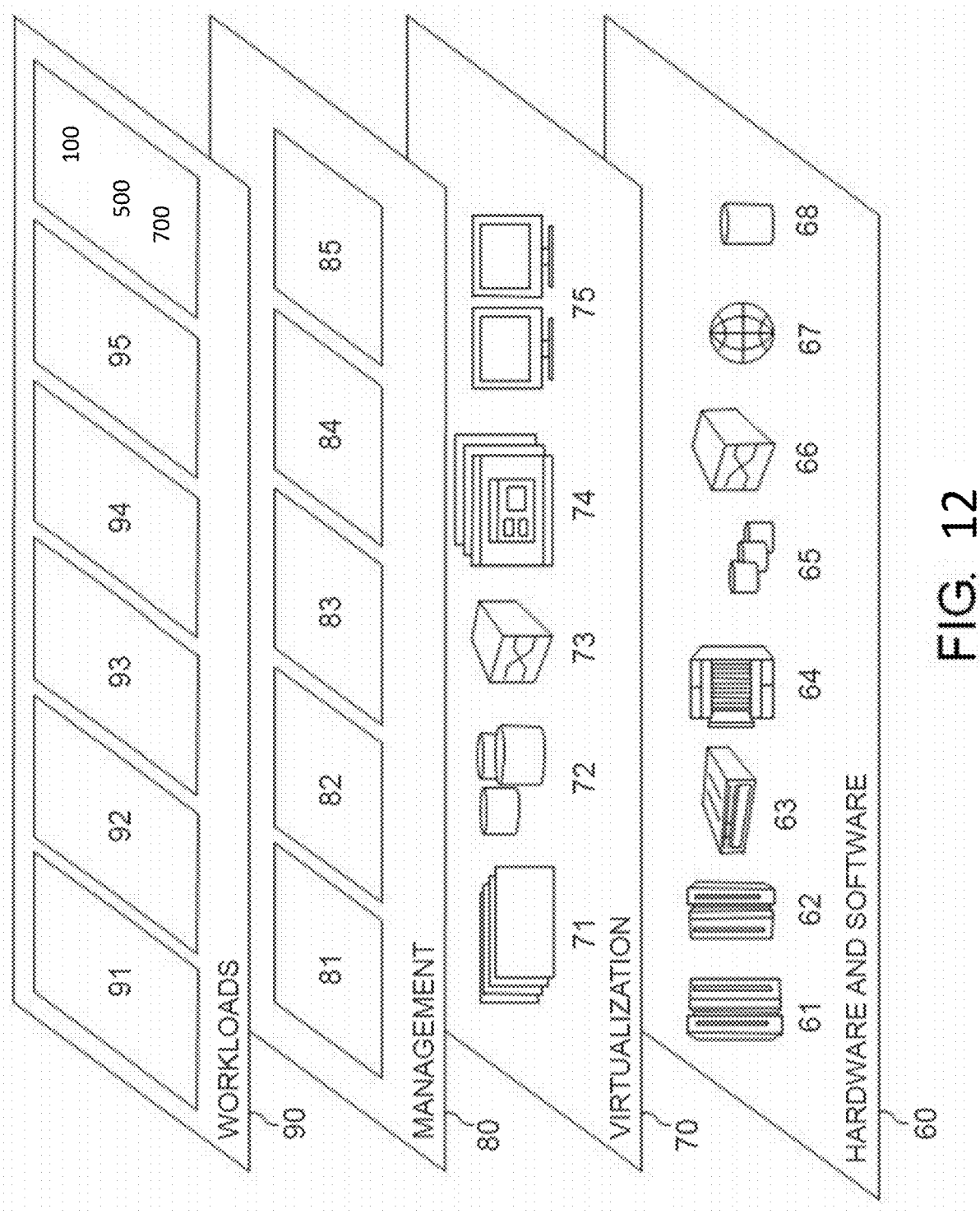
FIG. 12 depicts abstraction model layers according to an embodiment of the present invention.

Although as shown in FIGS. 10-12 and as described later, the computer system/server 12 is exemplarily shown in cloud computing node 10 as a general-purpose computing circuit which may execute in a layer the asynchronous execution facilitation system 100, the coordinated version control system 500, and the version enforcement system 700 (FIG. 12), it is noted that the present invention can be implemented outside of the cloud environment.

It is noted that a parameter server is, for example, a centralized place for learners to get latest aggregated parameters. The parameter server collects the parameters from multiple learners, conducts aggregation, and sends the aggregated values back to the learners. Learners communicate with the parameter servers through push/pull interfaces. A "push" is defined as the learners pushing computations back to the server, whereas a "pull" is defined as the learners pulling compiled computations from the server to perform a new computation at a next epoch.

Referring to FIG. 1 and the asynchronous execution facilitation system 100, the server checking circuit 101 checks the aggregation condition based on an intermediate version vector. The aggregation condition is based on the number of updated epochs.

The epoch update checking circuit 102 checks the number of updated epochs (A) based on the number of learners (N) that have pushed the updated parameters to the server.

The aggregation triggering circuit 103 triggers for the server to aggregate the pulled parameters from the learners when the number of updated epochs equals the number of learners multiplied by a portion (p) of the learners (e.g., when $\Delta = N \times p$). "p" is between 0 and 1 where 1 indicates synchronous execution. In other words, the server aggregates the pulled parameters from the learners when a proportion of the learners have completed the current calculations at that particular epoch. In this manner, the aggregation triggering circuit 103 can particularly set the value "p", thereby to create a rule for how tolerant the system 100 can be to slower (or faster) learner side computations.

For example, if the system 100 wants to be nearly (i.e., substantially) synchronous, the aggregation triggering circuit 103 can preferably set "p" to be near (i.e., 0.97, 0.98, 0.99, etc.) a value of 1 such that all learners need to complete all computations at the particular epoch before the server completes aggregation and pushes the aggregation to the learners for a new epoch to begin.

Alternatively, the aggregation triggering circuit 103 can set "p" to be a smaller value such that the system 100 acts in a more asynchronous manner in that the lower the portion of the learners that need to push the completed calculation to the server before the server performs an aggregation is less, such that the server 100 can advance to additional epochs with less learners completing the computations of the current epoch.

Figure 3:
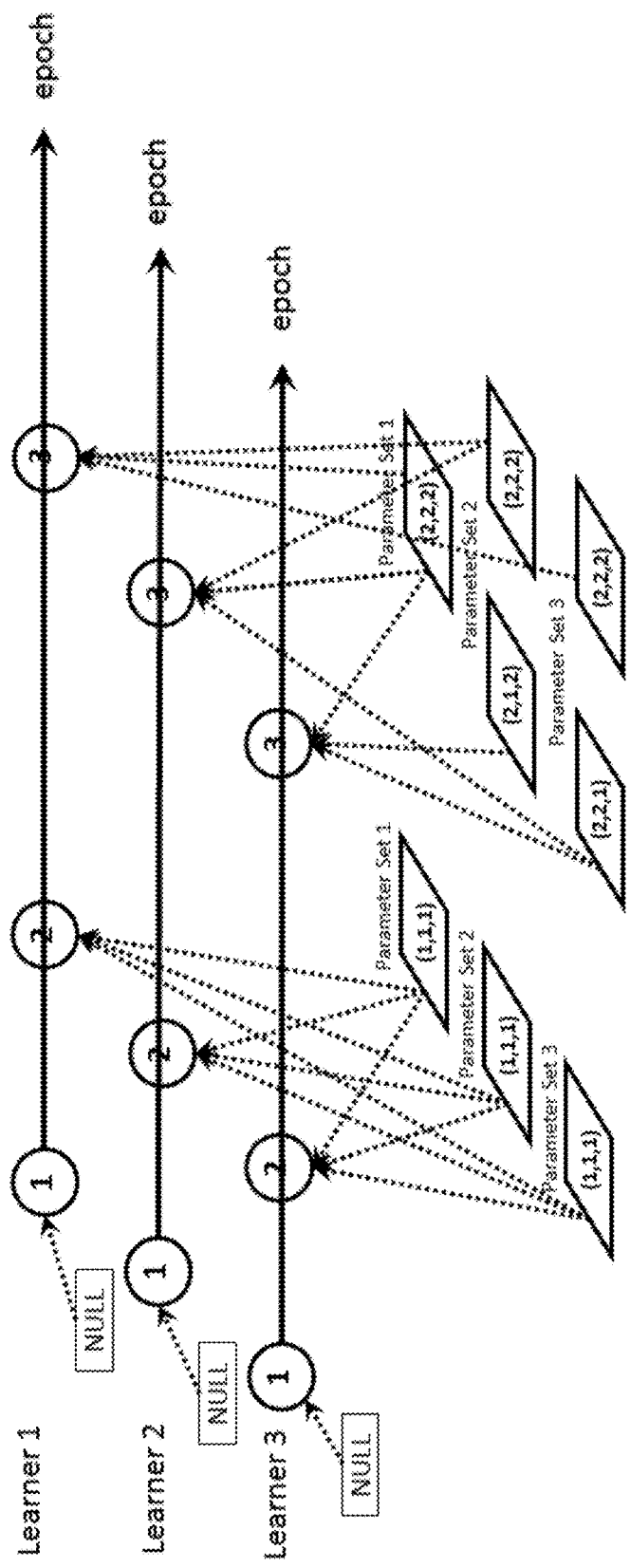
FIG. 3 exemplarily shows a first depiction of learners and servers communicating parameters at different epochs.

Referring to FIG. 3, for example, if "p" is set to 0.6, when 2 of the 3 learners complete the calculations for the parameter sets 1, 2, and 3 at epoch 2, the aggregation triggering circuit 103 will trigger the server to aggregate the parameter sets. For example, as shown in FIG. 3 at epoch 3, parameter set 1 has version (2, 2, 2), parameter set 2 has two versions of (2, 1, 2) and (2, 2, 2) and parameter set 3 has two versions of (2, 2, 1) and (2, 2, 2). It is noted that the versions are labeled as (Version of Learner 1, Version of Learner 2, and Version of Learner 3).

Therefore, the asynchronous execution facilitation system 100 can create rules for the server to determine when to perform aggregation.

Further, each pull carries an immediate version vector along with the local epoch that is checked by the server checking circuit 101. That is, the learners continuously send updates to the server, each time with its epoch number and the immediate version vector (i.e., (1, 2, 1), (2, 1, 2), etc.) that the learner has received from the server. The learner's epoch number informs the server of the learner's progress. The intermediate version vector indicates the how old the parameter being used by the learner is.

The aggregation returning circuit 104 compares the immediate version vector of the aggregated parameters to a comparison condition and causes the server to return a new aggregated parameter back to the learner when the version vector of the aggregated parameters satisfies the comparison condition. The comparison condition is a condition to determine if the current version of the aggregated parameter on the server is significantly newer than what the learner is using. For example, "significantly newer" may mean more than two epochs newer. If the comparison condition is not met, the aggregation returning circuit 104 allows the learner to continue to perform calculations. Therefore, if the most recent received version vector is very close to the current version on the parameter server, then there is no need for the server to send back the current version. This avoids too frequent communication which could congest the network.

The comparison condition can also be based on $\Delta = N \times p$.

Therefore, the asynchronous execution facilitation system 100 can also create rules for a server to determine when and what data shall be returned back to a learner given the learners request (e.g., epoch and learner's most recent version vector).

Figure 2:
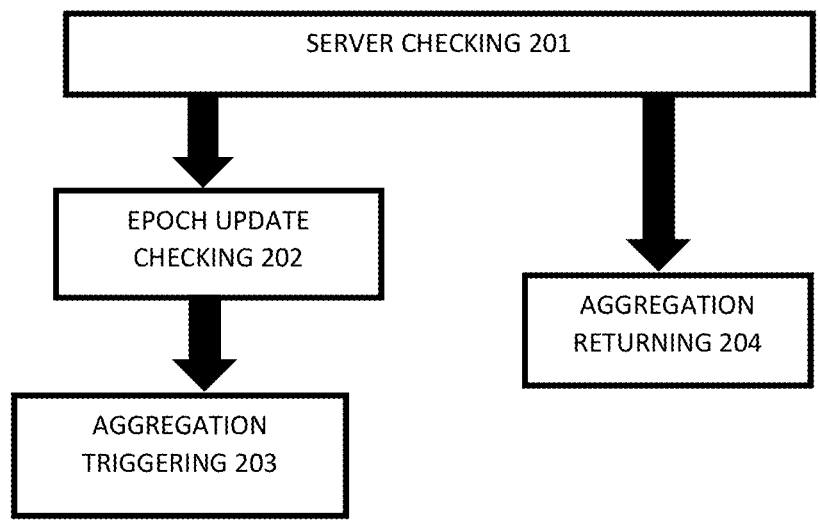
FIG. 2 exemplarily shows a high level flow chart for an asynchronous execution facilitation method 200.

FIG. 2 shows a high level flow chart for a method 200 of asynchronous execution facilitation.

Step 201 checks the aggregation condition based on the intermediate version vector. The aggregation condition is based on the number of updated epochs and checks each pull that carries a version vector along with the local epoch.

Step 202 checks the number of updated epochs ($\Delta$) based on the number of learners (N) that have pushed the updated parameters to the server.

Step 203 triggers for the server to aggregate the pulled parameters from the learners when the number of updated epochs equals the number of learners multiplied by a portion (p) of the learners (e.g., when $\Delta = N \times p$).

Step 204 compares the versions vector of the aggregated parameters to a comparison condition and causes the server to return a new aggregated parameter back to the learner when the version vector of the aggregated parameters satisfies the comparison condition.

Referring to FIG. 3, FIG. 3 illustrates an exemplary issue with uncoordinated asynchronous execution. As depicted, at epoch 3, the parameters used by Learner 2 (i.e., (2, 2, 2) of parameter set 2) and Learner 3 (i.e., (2, 1, 2) of parameter set 2) contain mismatched versions.

When each learner conducts its computation, the versions of all the parameter sets used for the computation should be the same, even if the versions are not the latest. Otherwise, the computations may be incongruous with computations by other learners.

With reference to FIG. 5, it is noted that the parameter server is split up into multiple parameter servers completing a sub-set of the aggregation calculation. Therefore, the "leader" and the "followers" need to be assigned in the coordinated version control system. To elect a leader, a Raft leader election protocol, a Zab leader election protocol, a Paxos leader election protocol, or the like may be used. Once the "leader" is determined, the remaining servers are the "followers".

The leader parameter collecting circuit 501 collects the parameter data from each of the learners for the leader parameter set at a previous epoch (e.g., epoch 2 of FIG. 3).

Also, the follower parameter collecting circuit 505 collects the parameter data from each of the learners for the follower parameter sets (e.g., epoch 2 of FIG. 3).

The leader aggregated parameter generating circuit 502 generates a new version of the aggregated parameter set from the collected parameter data of each learner (i.e., epoch 3 of FIG. 3). It is noted that the leader aggregated parameter generating circuit 502 can generate the new version of the aggregated parameter set based on the asynchronous execution facilitation of the system 100 of FIG. 1.

In other words, if parameter set 3 as shown in FIG. 3 is the leader, the leader aggregated parameter generating circuit 502 creates a new aggregated parameter set 3 (2, 2, 1) to be pulled by the learners at epoch 3.

The event broadcasting circuit 503 broadcasts a broadcast event indicating that a new version of an aggregated parameter set has been created by the leader aggregated parameter generating circuit 502. The broadcast event includes the new version of the aggregated parameter set of the leader. The broadcasting circuit 503 broadcasts the broadcast event to the parameter servers within the server cluster.

The broadcast detecting circuit 506 detects the broadcast event and causes the checking circuit 507 to check the versions that have been completed by the learners. The checking circuit 507 checks each of the followers to determine if a matching parameter set version has been created (e.g., if a (2, 2, 1) parameter set exists in each of the followers).

If a matching version of the parameter set to the leader has not been created, the follower aggregated parameter generating circuit 508 generates a new version of the aggregated parameter set for each of the followers to match the version of the leader.

Then, as the server receives a pull request from each of the learners, the leader pull requesting circuit 504 and the follower pull requesting circuit 509 authorizes the learners to pull the aggregated matching parameter sets.

For example, as shown in FIG. 3, if the leader is parameter set 3 and the leader aggregated parameter generating circuit 502 generates the new version of the aggregated parameter set 3 as (2, 2, 1), the event broadcasting circuit 503 will broadcast the broadcast event in which the checking circuit 507 will check as to whether the followers (i.e., parameter set 2 and parameter set 3) have finished computations from a previous epoch such that the follower aggregated parameter generating circuit 508 can generate the same version of the aggregated parameter sets 2 and 3 of version (2, 2, 1) for each of the followers.

Figure 4:
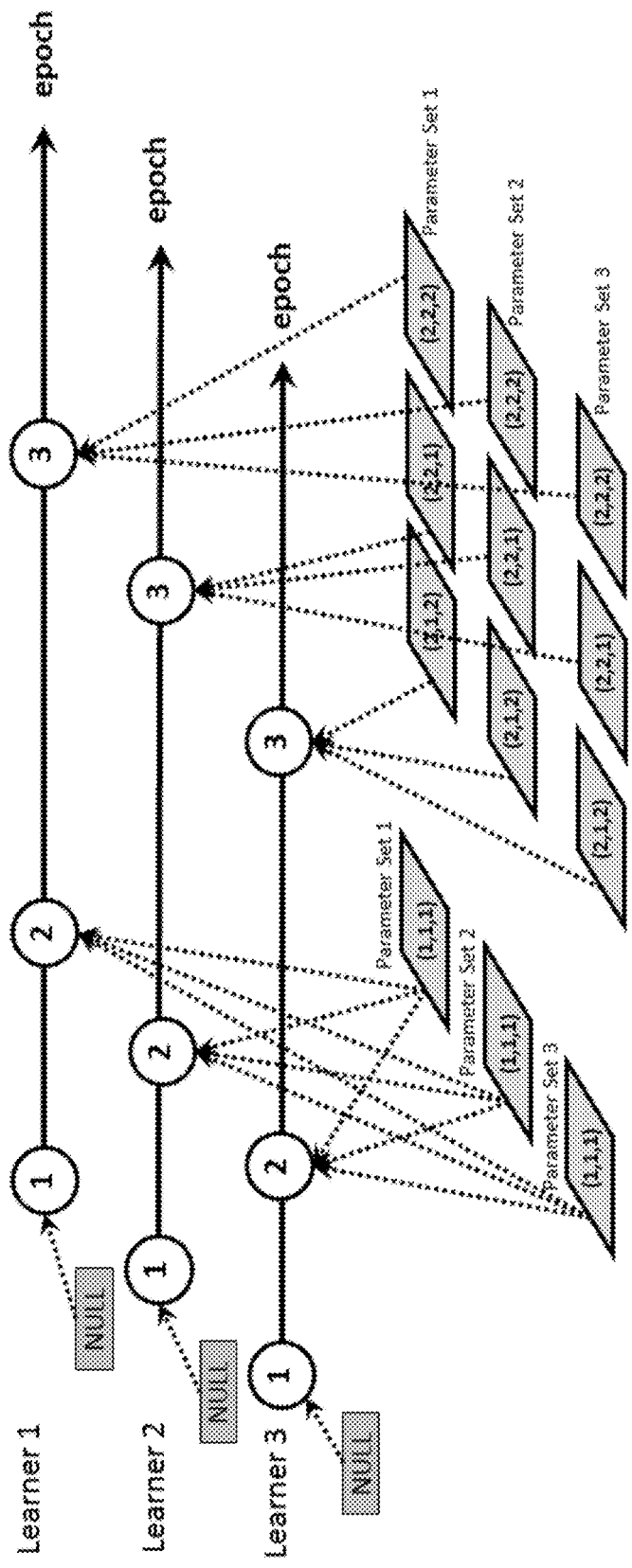
FIG. 4 exemplarily shows a second depiction of learners and servers communicating parameters at different epochs.

Thus, as shown in FIG. 4, each parameter set 1, 2, and 3 includes version (2, 2, 1), such that the learners can pull the same aggregated version and computations remain consistent. That is, the pull request is not granted by the server (i.e., by the leader pull requesting circuit 504 and the follower pull requesting circuit 509) to return the new parameter set back to the learner until the parameter set versions are synchronized.

The coordinated version control system 500 therefore can cause each of the followers to generate the same version of parameter sets in lockstep manner with the leader so as to coordinate the computations. The followers each create the new versions of the aggregated parameter sets in an on-demand manner which facilitates version consistently.

Figure 9:
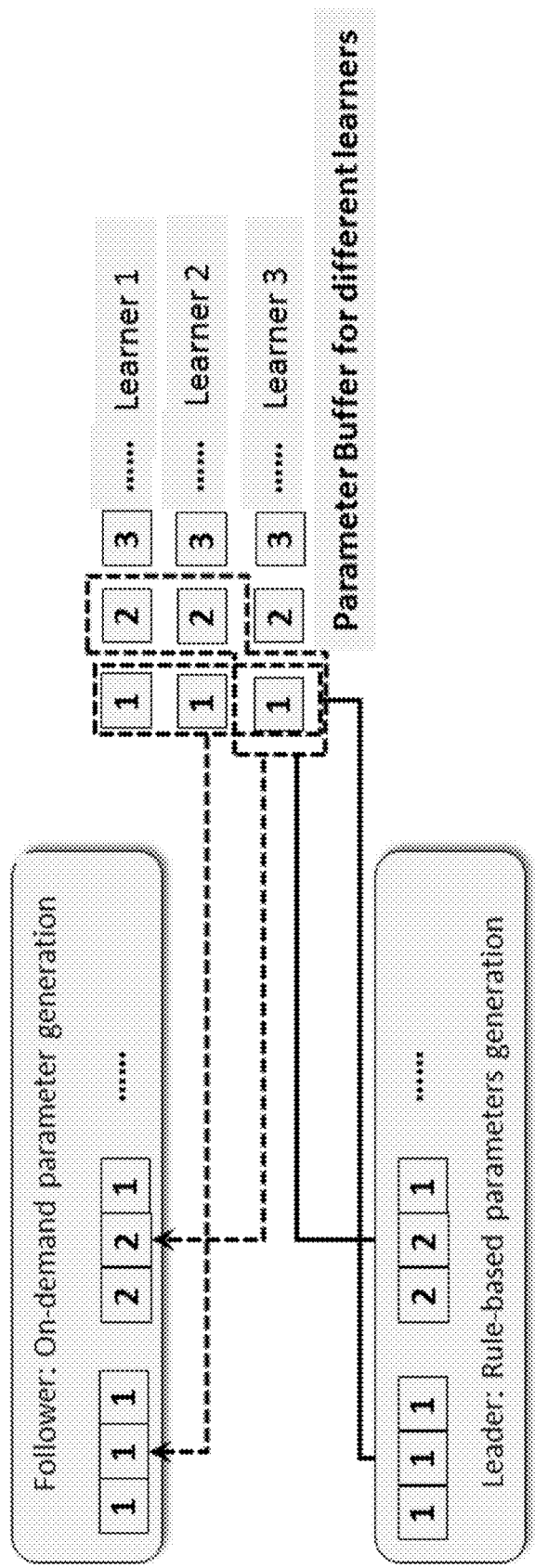
FIG. 9 depicts an exemplary embodiment of the coordinated version control system 500.

As shown in FIG. 9, the leader aggregated parameter generating circuit 502 generates a new version of the aggregated parameter set of (2, 2, 1) based on the rules of the asynchronous execution facilitation system 100. Based on the broadcast event, the follower aggregated parameter generating circuit 508 will generate a matching version of the aggregated parameter set of (2, 2, 1) such that the server can satisfy a pull request and continue to make computations even if learner 3 has not finished with version 2 for this particular parameter set. It is noted that as learner 3 completes version 2, the leader will create a new version of the aggregated parameter set of (2, 2, 2) and the followers will follow.

In other words, based on the rules of a new version being created, the system 500 can more efficiently move forward with computations.

Figure 6:
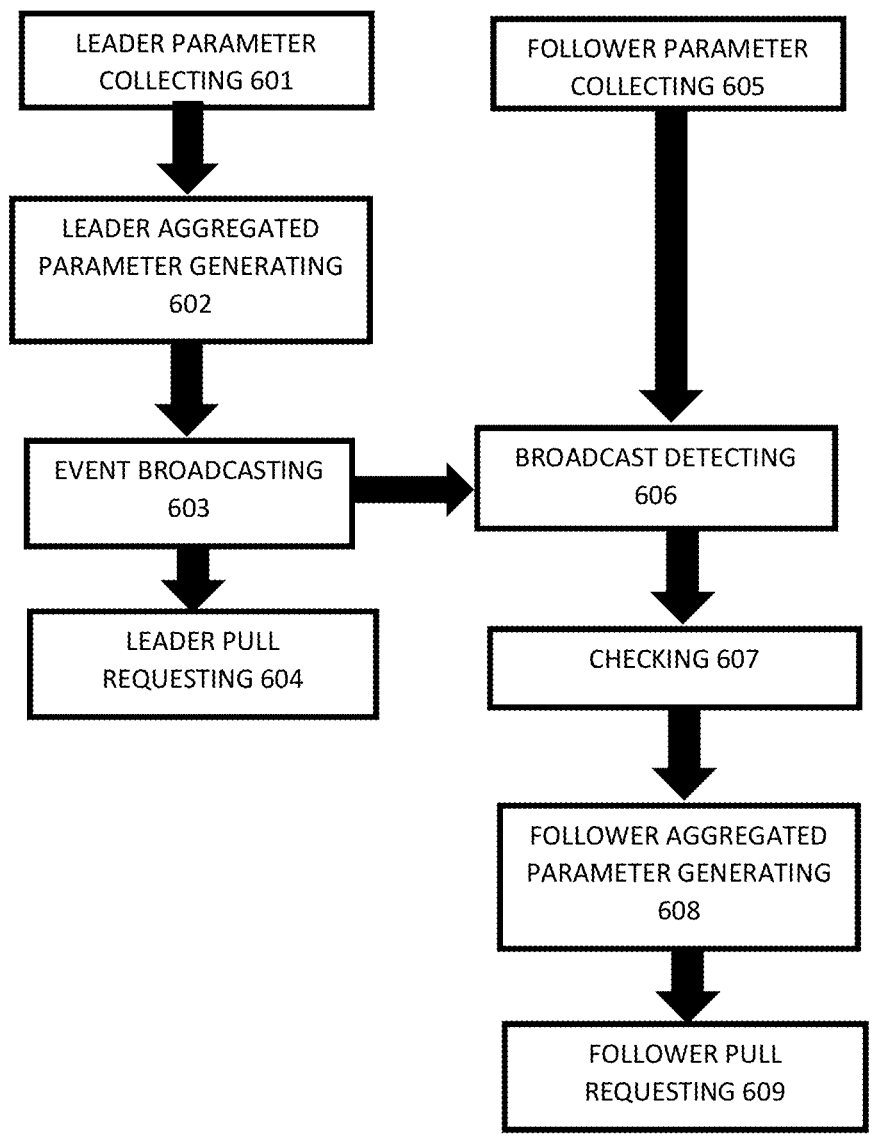
FIG. 6 exemplarily shows a high level flow chart for a coordinated version control method 600.

FIG. 6 shows a high level flow chart for a method 600 of coordinated version control.

Step 601 collects the parameter data from each of the learners for the leader parameter set at a previous epoch (e.g., epoch 2 of FIG. 3).

Also, Step 605 collects the parameter data from each of the learners for the follower parameter sets (e.g., epoch 2 of FIG. 3).

Step 602 generates a new version of the aggregated parameter set from the collected parameter data of each learner (i.e., epoch 3 of FIG. 3). It is noted that Step 602 can generate the new version of the aggregated parameter set based on the asynchronous execution facilitation method 200 of FIG. 2.

Step 603 broadcasts a broadcast event indicating that a new version of an aggregated parameter set has been created by Step 602.

Step 606 detects the broadcast event and causes Step 607 to check the versions that have been completed by the learners. Step 607 checks each of the followers to determine if a matching parameter set version has been created.

If a matching version of the parameter set to the leader has not been created, step 608 generates a new version of the aggregated parameter set for each of the followers to match the version of the leader.

Then, as the server receives a pull request from each of the learners, Step 604 and Step 609 authorizes the learners to pull the aggregated matching parameter sets.

With reference to FIG. 7, the version enforcement system 700 can enforce version consistency implanted from a learner side of distributed machine learning.

The parameter collecting circuit 701 collects all of the parameter sets from the parameter servers.

The version examining circuit 702 determines a version of the parameter set for each of the parameter servers. For example, as shown in FIG. 3 at epoch 3, parameter set 1 has version (2, 2, 2), parameter set 2 has two versions of (2, 1, 2) and (2, 2, 2) and parameter set 3 has two versions of (2, 2, 1) and (2, 2, 2). It is noted that the versions are labeled as (Version of Learner 1, Version of Learner 2, and Version of Learner 3).

The mismatch detecting circuit 703 detects if a mismatch occurs between each of the parameter sets. If the mismatch detecting circuit 703 detects that there is not a mismatch (i.e., each version is the same) then the local parameter updating circuit 704 automatically updates the local parameters for the computation by a learner.

For example, as shown in FIG. 3, there is a mismatch in that when learner 3 pulls the aggregated parameter sets of parameter set 1, 2, and 3, parameter set 1 and parameter set 2 do not include the version of the aggregated parameter set (2, 2, 1) of parameter set 3. Therefore, the mismatch detecting circuit 703 detects the mismatch and the determining circuit 705 determines a correct version for each of the parameter sets to follow.

The determining circuit 705 can use, for example, a Quorum approach (i.e., which version is most prevalent) to determine which version to follow. That is, the determining circuit 705 can determine to follow the version of parameter set 3 of (2, 2, 1), parameter set 2 of (2, 1, 2), or parameter set 1 of (2, 2, 2) being pulled by learner 3 at epoch 3.

Preferably, the determining circuit 705 determines to use the version that is the most up to date for each of the learners. In other words, the parameter set of (2, 2, 2) of FIG. 3 would preferably be used and each of the parameter set 2 and 3 has a match.

After the determining circuit 705 determines which version to follow, the requesting circuit 706 requests that each of the other parameter sets produce the same version, such that the learner can pull matching versions. For example, the requesting circuit 706 can request that parameter set 1 and parameter set 2 produce version (2, 2, 1).

When parameter set 1 receives the request for the matching version, parameter set 1 and parameter set 2 would produce version (2, 2, 1) by using the cached version of learner 3 version 1 and then replying to the request with this version.

In requesting the matching version, it is noted that the parameter set may need to wait for a new parameter set to be pushed to the server. That is, if parameter set 2 did not include (2, 2, 2) but only included (2, 1, 2), the requesting circuit 706 would request that parameter set 2 wait for version 2 of the learner 2 to be completed.

Because of the above situation in which sometimes the version has not yet reached the server and is thus not in the cache, the retrying circuit 707 will retry to retrieve the version requested for a predetermined number of attempts or a predetermined time.

The success checking circuit 708 verifies that the requested version has been retrieved from each of the other parameter sets within the predetermined number of attempts or the predetermined time.

If the requested version is verified by the success checking circuit 708, the local parameter updating circuit 704 automatically updates the local parameters for the computation by a learner with the matching versions of the aggregated parameter sets.

However, if the success checking circuit 708 cannot verify that the matching version is retrieved within the predetermined number of attempts or the predetermined time, the time out determining circuit 709 determines that the current version cannot be retrieved and will attempt to use a different version as determined by the determining circuit 705.

As discussed above, the determining circuit 705 will preferably choose the most up-to-date version from the parameter set to have the other parameter sets match. Therefore, the time-out determining circuit 709 will alleviate an issue where each of the other learners are too far behind in computations and cannot catch up to the most current version. Therefore, the time out determining circuit 709 will cause the determining circuit 705 to pick an "out of date version" such as (2, 2, 1) with the Learner 3 still being on the first version and having the parameter set 1 and parameter set 2 produce an out-of-date aggregated version from the cache.

Thus, the version enforcement system 100 can allow for calculations to still advance to reduce system slow down but still ensure that each learner is using the same version in the computations to avoid null returns.

Therefore, as shown in FIG. 4, each of the learners pulls a matching version of the aggregated parameter set from each of the parameter sets as a result of the version enforcement system 700.

Figure 8:
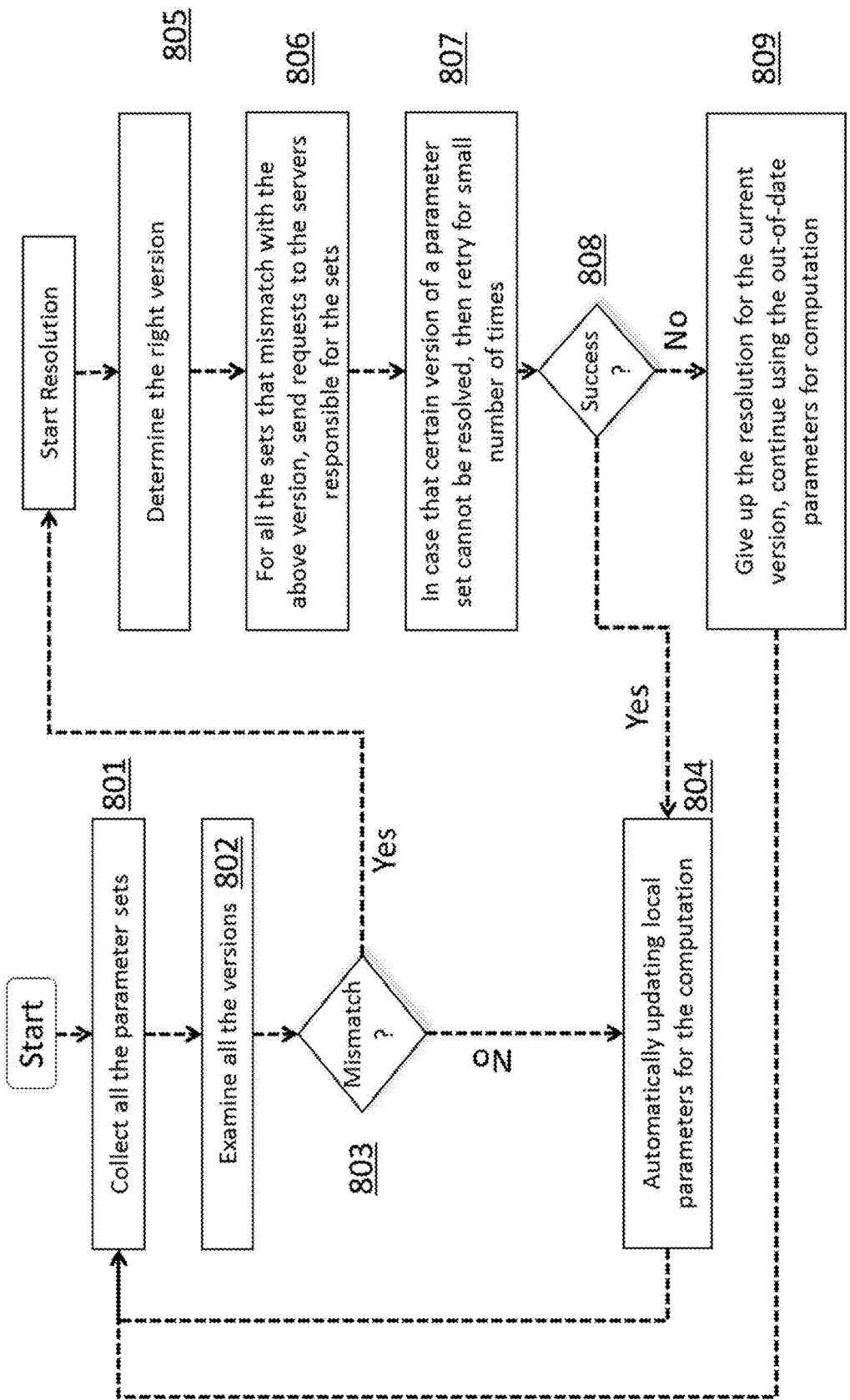
FIG. 8 exemplarily shows a high level flow chart for a version enforcement method 800.

FIG. 8 shows a high level flow chart for a method 800 of version enforcement.

Step 801 collects all the parameter sets.

Step 802 determines a version of the parameter set for each of the parameter servers. For example, as shown in FIG. 3 at epoch 3, parameter set 1 has version (2, 2, 2), parameter set 2 has two versions of (2, 1, 2) and (2, 2, 2) and parameter set 3 has two versions of (2, 2, 1) and (2, 2, 2). It is noted that the versions are labeled as (Version of Learner 1, Version of Learner 2, and Version of Learner 3).

Step 803 determines if there is a mismatch between the version selected by Step 802 and the other versions of the other parameter sets. If no, then the method proceed to Step 804 in which Step 804 automatically updates the local parameters for the computation by a learner.

If YES for Step 803, the method 800 starts a resolution and proceeds to Step 805. Step 805 determines a correct version for each of the parameter sets to follow.

Step 806 sends requests to the other parameter sets responsible for the sets for all the sets that mismatch with the determined correct version to follow. That is, Step 806 requests that each of the other parameter sets produce the same version such that the learner can pull matching versions.

Step 807 retries to retrieve the version requested for a predetermined number of attempts or a predetermined time from Step 806.

Step 808 verifies that the requested version has been retrieved from each of the other parameter sets within the predetermined number of attempts or the predetermined time.

If Step 808 determines YES, then the method proceeds to Step 804 because no mismatch exists.

If Step 808 determines NO, Step 809 gives up the resolution of the current version and uses an out of date version to request from the other parameter sets.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 10, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and data store software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide prearrangement for, and procurement of cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the asynchronous execution facilitation system 100, the coordinated version control system 500, and the version enforcement system 700 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A version enforcement system having a server side and a client side including parameter servers having a plurality of parameter sets and a plurality of learners communicating with the plurality of parameter sets, the system comprising:
on only the server side,
a parameter collecting circuit configured to collect all of the parameter sets from the parameter servers;
a version examining circuit configured to determine a version of the parameter set for each of the parameter servers;
a mismatch detecting circuit configured to detect a match between each of the parameter sets; and
a local parameter updating circuit configured to automatically update local parameters for a computation by a learner based on the mismatch detecting circuit detecting that there is not a mismatch by confirming the match between each of the parameter sets,
wherein, based on the mismatch detecting circuit detecting a mismatch between each of the parameter sets, causing the learner to utilize a most up-to-date version from the collected parameter sets for the computation.

2. A version enforcement method having a server side and a client side including parameter servers having a plurality of parameter sets and a plurality of learners communicating with the plurality of parameter sets, the method comprising:
on only the server side,
collecting all of the parameter sets from the parameter servers;
determining a version of the parameter set for each of the parameter servers;
detecting a match between each of the parameter sets; and
automatically updating local parameters for a computation by a learner based on the match between each of the parameter sets being detected which confirms that there is not a mismatch,
wherein, based on a mismatch being detected between each of the parameter sets, causing the learner to utilize a most up-to-date version from the collected parameter sets for the computation.

3. An asynchronous execution facilitation system having a server side and a client side including parameter servers having a plurality of parameter sets and a plurality of learners communicating with the plurality of parameter sets, comprising:
on only the server side,
collecting all of the parameter sets from the parameter servers;
determining a version of the parameter set for each of the parameter servers;
detecting a match between each of the parameter sets; and
automatically updating local parameters for a computation by a learner based on the match between each of the parameter sets being detected which confirms that there is not a mismatch,
wherein, based on a mismatch being detected between each of the parameter sets, causing the learner to utilize a most up-to-date version from the collected parameter sets for the computation.

4. The version enforcement system of claim 1, wherein each of the parameter sets saves previous versions of the parameter sets, and
wherein the most up-to-date version is selected from the previous versions of the parameter sets.

5. The version enforcement system of claim 1, wherein if the parameter set of the parameter sets receives a request from the requesting circuit to generate an older version of the parameter set, the parameter set uses a cached version to generate a particular version to match the version of the correct version.

6. The version enforcement system of claim 1, further comprising a retrying circuit configured to cause the parameter sets to retry to generate the correct version for a predetermined number of attempts or for a predetermined amount of time.

7. The version enforcement system of claim 6, further comprising a time-out determining circuit configured to determine that the correct version has not been generated within the predetermined number of attempts or the predetermined amount of time based on the mismatch detecting circuit detecting the mismatch between each of the parameter sets, and wherein the time-out determining circuit causes the parameter collecting circuit to re-collect the plurality of parameter sets from the parameter server and select an out-of-date version as the most up-to-date version.

8. The version enforcement system of claim 1, wherein, if the mismatch detecting circuit detects that there is not a mismatch between versions of each of the parameter sets, then the local parameter updating circuit automatically updates local parameters and causes computation by a learner for the matching versions of each of the parameter sets.

9. The version enforcement system of claim 1, wherein the determining circuit uses a Quorum approach to determine which version to follow as the correct version.

10. The version enforcement system of claim 1, wherein the correct version includes a most recent version of a computation from each of the plurality of learners.

11. The version enforcement system of claim 1, wherein the correct version includes a version currently existing in at least one of the parameter sets.

12. A non-transitory computer-readable recording medium recording for version enforcement performing the method of claim 2.

13. The version enforcement system of claim 1, Wherein the learner uses the most up-to-date version from the collected parameter sets for the computation when the mismatch is detected to allow for calculations to advance to reduce a slow down while causing each learner to use the same version in the computations to avoid null returns.

* * * * *